United States Patent [19]

Mitsukawa

[11] Patent Number: 4,544,280
[45] Date of Patent: Oct. 1, 1985

[54] GRAIN HANDLING SYSTEM

[75] Inventor: Zendo Mitsukawa, Higashihiroshima, Japan

[73] Assignee: Satake Engineering, Co., Ltd., Tokyo, Japan

[21] Appl. No.: 554,783

[22] Filed: Nov. 25, 1983

[30] Foreign Application Priority Data

Dec. 11, 1982 [JP] Japan ............................. 57-216266
Jun. 16, 1983 [JP] Japan ............................. 58-108928

[51] Int. Cl.[4] ............................................. B01F 15/04
[52] U.S. Cl. ........................................ 366/141; 222/55; 364/479; 364/567; 366/18
[58] Field of Search ................. 366/141, 160, 18, 16, 366/17, 19, 142; 222/55, 57, 64; 364/502, 479, 567; 177/70, 89; 417/37

[56] References Cited

U.S. PATENT DOCUMENTS

| 3,966,000 | 6/1976 | Allen ........................................ 177/1 |
| 4,054,784 | 10/1977 | Ricciardi .............................. 364/479 |
| 4,272,824 | 6/1981 | Lewinger ............................. 366/141 |
| 4,301,510 | 11/1981 | Ricciardi .............................. 364/567 |
| 4,353,482 | 10/1982 | Tomlinson ........................... 222/55 |

FOREIGN PATENT DOCUMENTS 1926054 12/1969 Fed. Rep. of Germany .
2312129 12/1974 Fed. Rep. of Germany .
115346 8/1979 Japan .
10613 1/1983 Japan .
1584886 2/1981 United Kingdom .

OTHER PUBLICATIONS

Fordern und Heben, vol. 6, pp. 357-359, Jun. 6/1960.
Regelungstechnik, vol. #3, First Annual Volume 1953, pp. 60-63, Jan./1953.
Feinwerktechnik vol. 66/1962, No. 10, pp. 364-366, 5/1962.
ATM Blatt V 122-1, Apr. 1967, pp. 69-74.

Primary Examiner—Robert W. Jenkins
Attorney, Agent, or Firm—Henry Sternberg; Bert J. Lewen

[57] ABSTRACT

A grain handling system comprises a valve device for controlling a flow rate discharged from a downstream end of at least one flow passage. A volumetric weight measuring device measures the weight per unit volume of the grain delivered toward the valve device to generate a volumetric weight signal. A computer generates a control signal on the basis of the volumetric weight signal. A drive device drivingly connected to the valve device is operative in response to the control signal to drive the valve device so as to allow the grain discharged from the valve device to be controlled in terms of weight unit.

31 Claims, 5 Drawing Figures

GRAIN HANDLING SYSTEM

BACKGROUND OF THE INVENTION

1. Field of the Invention

The present invention relates to a grain handling system.

1. Description of the Prior Art

For example, as disclosed in Japanese Utility Model Application Laid-Open No. 115346/79, a known grain handling system includes a tank provided with a discharge port and a valve at the discharge port and variable in opening degree for controlling a flow rate of the grain discharged from the discharge port. The grain is discharged through the valve at a desired volume. A weight of the grain having a constant volume varies depending upon its grain size, surface roughness, amount of moisture content and the like. With such known grain handling system, although the volume of the grain discharged through the valve can be controlled or regulated, the gravimetric flow rate of the grain discharged cannot be accurately controlled.

SUMMARY OF THE INVENTION

An object of the invention is to provide a grain handling system capable of accurately controlling the grain discharged through a valve device in terms of weight unit.

According to the present invention, there is provided a grain handling system comprising at least one flow passage defining means for defining a grain flow passage having an upstream intake end and a downstream discharge end so as to allow the grain to flow along the grain flow passage from the upstream intake end to the downstream discharge end, valve means disposed in communication with the downstream discharge end of the grain flow passage for controlling flow rate of the grain discharged from the downstream discharge end, volumetric weight measuring means for measuring a volumetric weight of the grain delivered toward the valve means to generate a corresponding volumetric weight signal, computer means connected to the volumetric weight measuring means for receiving the volumetric weight signal therefrom to generate a control signal on the basis of the volumetric weight signal, and drive means drivingly connected to the valve means and connected to the computer means, the valve means being operative in response to the control signal from the computer means to drive the valve means so as to allow the grain discharged through the valve means to be controlled in terms of weight unit.

DETAILED DESCRIPTION OF THE PREFERRED EMBODIMENTS

Figure 1:
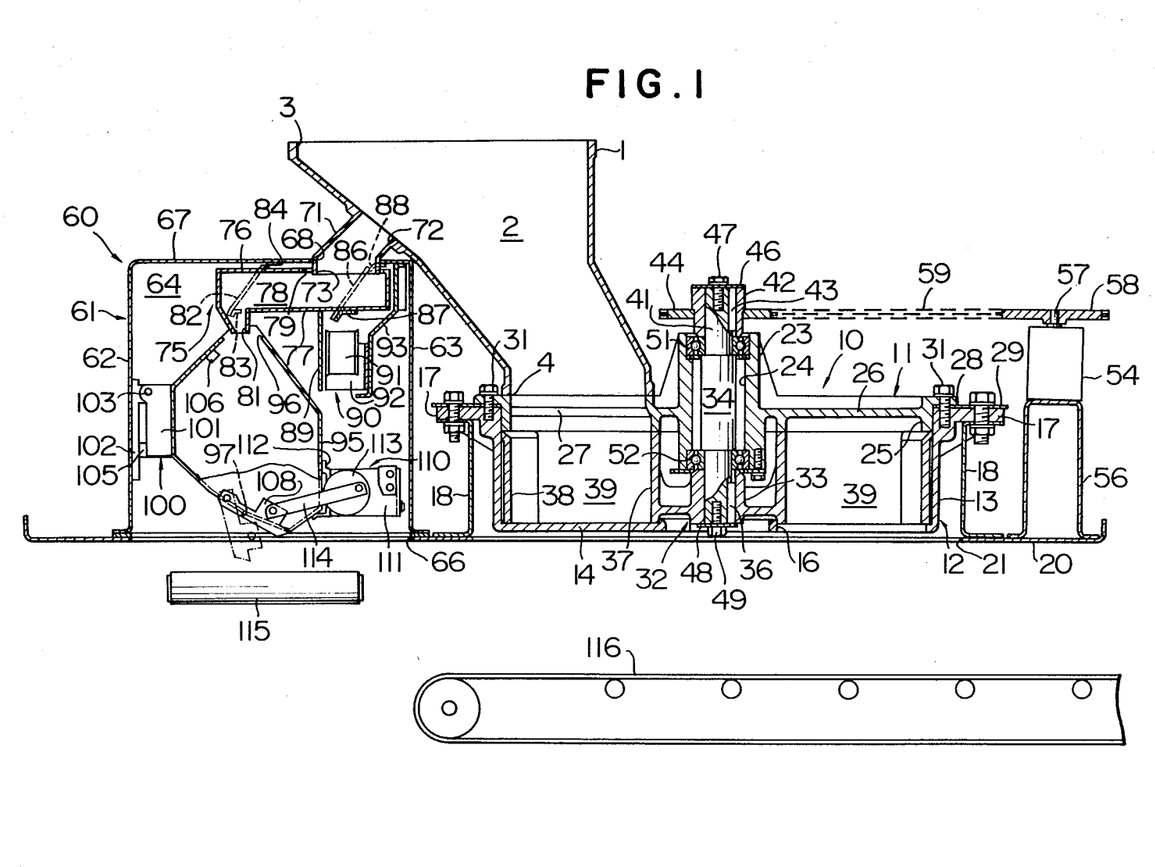
FIG. 1 is a schematic cross-sectional view of a grain handling system in accordance with a first embodiment of the present invention.

Referring to FIG. 1, a grain handling system in accordance with a first embodiment of the present invention comprises a duct 1 defining a grain flow passage 2 having an upstream intake end 3 and a downstream discharge end 4. The upstream intake end 3 of the duct 1 is communicatable with a downstream discharge end of a delivery device such as a conveyor or a discharge port of a tank, for example, and receives the grain from the downstream discharge end of the delivery device or the discharge port of the tank. The grain delivered to the upstream intake end 3 of the flow passage 2 flows therethrough and is discharged from the downstream discharge end 4.

A rotary valve assembly generally designated by reference character 10 is disposed in communication with the downstream discharge end 4. The rotary valve assembly 10 includes a casing having an upper casing section 11 and a lower casing section 12. The lower casing section 12 comprises a circumferential wall 13, an annular bottom wall 14 having therein an opening 16, and a plurality of circumferentially spaced flanges 17 projecting radially outwardly from an upper edge of the circumferential wall 13. The lower casing section 12 is fixedly supported in position at the flanges 17 by a plurality of stays 18 secured to a base 20. The opening 16 in the bottom wall 14 of the lower casing section 12 communicates with an opening 21 in the base 20. The upper casing section 11 comprises a center hub 23 having therethrough a bore 24, an outer circumferential wall 25 fitted into the circumferential wall 13 of the lower casing section 12, an annular wall 26 extending between the center hub 23 and the outer circumferential wall 25 and has an opening 27 aligned with the downstream discharge end 4 of the passage 2, and an annular flange 28 extending radially outwardly from an upper edge of the outer circumferential wall 25, rested on the upper surfaces of the flanges 17 of the lower casing section 12 through a shim 29, and fastened to the flanges 17 by bolts 31. A rotary valve member 32 comprises a center hub 33 mounted on a shaft 34 extending through the bore 24 in the center hub 23 of the upper casing section 11, by means of a key 36 for rotation with the shaft 34, an inner circumferential wall 37 integral with the center hub 33, an outer circumferential wall 38, a plurality of circumferentially spaced radial vanes 39 extending between the inner and outer circumferential walls 37 and 38 to connect them to each other. Each pair of adjacent vanes 39 cooperate with each other to define an operating chamber having a predetermined volume. The shaft 34 has a protruding end portion 41 extending outwardly through and from the center hub 23 of the upper casing section 11. A sleeve 42 is mounted on the protruding end portion 41 of the shaft 34 by means of a key 43 for rotation with the shaft 34. A sprocket 44 is fixedly mounted on the sleeve 42. The key 43 is retained in position by a retainer plate 46 pressed against an end face of the protruding end portion 41 of the shaft 34 by a bolt 47. Similarly, the lower key 36 is retained in position by a retainer plate 48 pressed by a bolt 49 against an end face of the lower end portion of the shaft 34. The shaft 34 is rotatably journalled relative to the outer casing section 11 by a pair of upper and lower bearings 51 and 52 interposed between an outer peripheral surface of the shaft 34 and a wall surface of the bore 24 in the center hub 23 of the upper casing section 11.

A pulse motor 54 is fixedly mounted on a bracket 56 secured to the base 20. The pulse motor 54 has an output shaft 57 on which a sprocket 58 is mounted for rotation therewith. A chain 59 is trained around the sprockets 44 and 58 for transmitting a rotational torque of the pulse motor 54 to the shaft 34.

A volumetric weight measuring device generally designated by reference character 60 includes a housing 61 having four side walls 62, 63 and 64 (only three walls are shown in FIG. 1) surrounding an opening 66 in the base 20, and a top wall 67 having therein an opening 68. The duct 1 has a withdrawing branch duct 71 integral therewith which has an intake port 72 communicating with the flow passage 2 and a discharge port 73. The branch duct 71 has a free end portion thereof fitted into the opening 68 in the top wall 67 of the housing 61. The volumetric weight measuring device 60 includes a vibratory feeder 75 which has a top wall 76, a bottom wall 77 and opposite side walls 78 (only one shown in the figure). The top wall 76 has an opening 79, at an upstream end of the feeder 75, which has an opening area considerably larger than that of the free end portion of the branch duct 71, which defines the discharge port 73. The feeder 75 is provided at a downstream end thereof with a discharge port 81. The feeder 75 is mounted on the housing 61 by leaf springs 82 (only one is shown in FIG. 1) secured to brackets 83 respectively attached to the side walls 78 and brackets 84 attached to an inner surface of the top wall 67 of the housing 61 and leaf springs 86 fixed to opposite protruding ends of a bracket 87 secured to the bottom wall 77 and brackets 88 secured to the inner surface of the top wall 67 of the housing 61. The feeder 75 has fixed thereto an abutment plate 89 made of magnetizable material extending downwardly from the bottom wall 77. A vibrator 90 includes an oscillator 91 which is mounted on a bracket 92 in faced relation to the abutment plate 89. The bracket 92 is mounted on a bracket 93 securely mounted on the top wall 67 and the side walls 64 of the housing 61.

The volumetric weight measuring device 60 includes a container 95 having a top inlet opening 96 and a bottom discharge opening 97. A weight measuring mechanism 100 has a bracket 101 fixedly mounted on the container 95. The bracket 101 is mounted on a mount 102 secured to the side wall 62 of the housing 61 so as to be pivotable about a pin 103. A lower end of the bracket 101 abuts against a load cell 105 fixed to the mount 102. A level detector 106 fixed to an inner wall surface of the container 95 detects that the grain fed into the container 95 reaches a predetermined level, to generate a detecting signal. The valve member 108 pivotally mounted on the container 95 is movable between a normally closed position shown by the solid lines where the discharge opening 97 is closed and an open position shown by the two-dot-and-dash lines where the discharge opening is opened. A valve actuator 110 includes a motor 111 securely mounted on a bracket 112 fixed to the container 95, a disc 113 rotated by the motor 111, and a lever 114 having one end thereof pivotally mounted to the disc and the other end pivotally mounted to the valve member 108. Upon the energization of the motor 111, the disc 113 is rotated to cause the lever 114 to move the valve member 108 between its closed position and its open position.

A belt conveyor 115 is disposed just below the discharge port 97 of the container 95. A belt conveyor 116 is disposed below the opening 16 of the rotary valve assembly 10.

Figure 2:
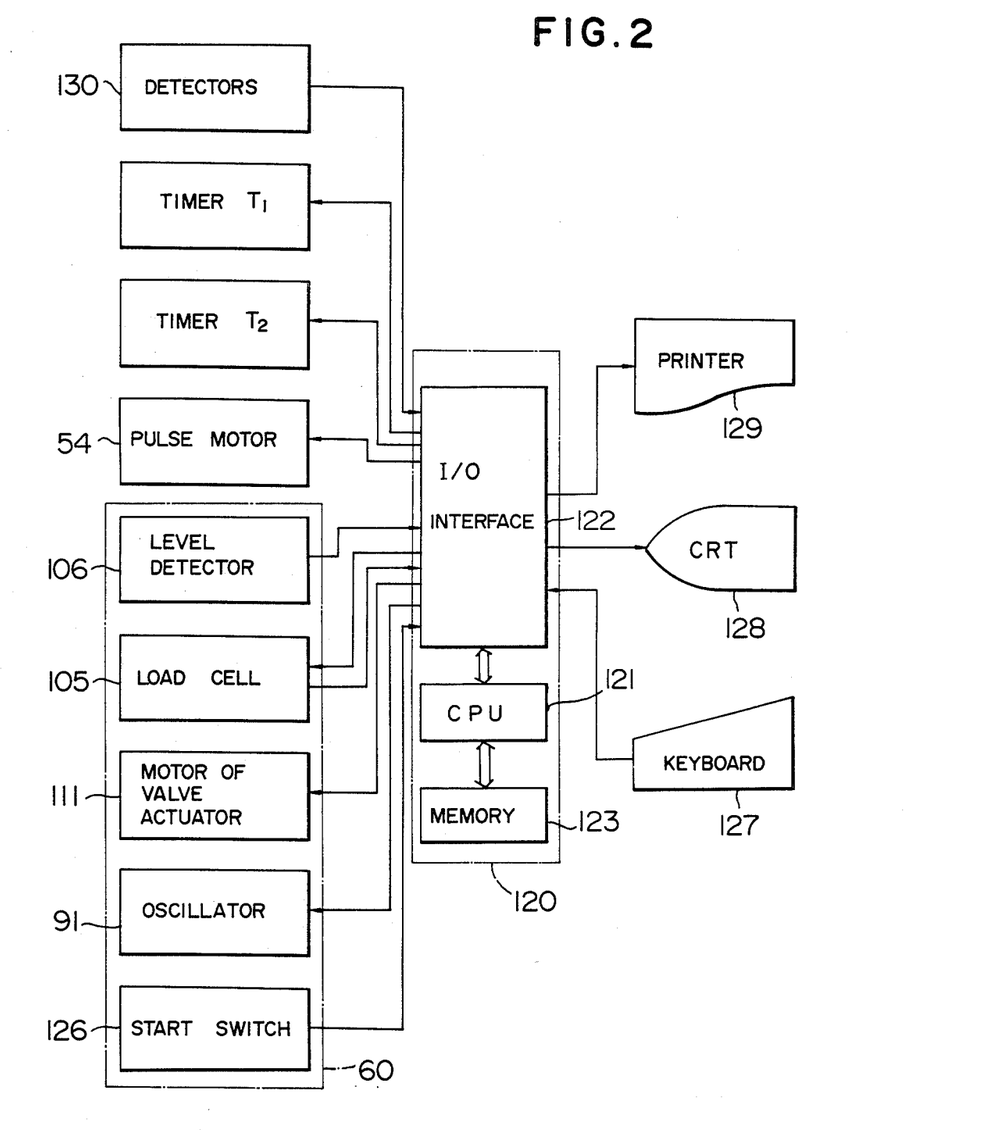
FIG. 2 is a block diagram of a control system incorporated in the grain handling system shown in FIG. 1.

Referring now to FIG. 2, a control system incorporated in the grain handling system in accordance with the first embodiment of the invention comprises a microcomputer 120 having a CPU (Central Processing Unit) 121, and I/O interface (INPUT/OUTPUT INTERFACE) 122 connected to the CPU and a memory 123 connected to the CPU. A start switch 126 for the volumetric weight measuring device 60, the level detector 106, the load cell 105 of the weight measuring mechanism 100, the motor 111 of the valve actuator 110, and the oscillator 91 of the vibrator 90 are connected to the I/O interface 122. The start switch 126 is movable between an "ON" position where the volumetric weight measuring device 60 is activated and an "OFF" position where the volumetric weight measuring device 60 is deactivated. Also, the pulse motor 54 is connected to the I/O interface 122. A timer $T_1$ connected to the I/O interface sets a time duration (for example, four (4) minutes) corresponding to a time duration required from a time the oscillator 91 of the vibrator 90 is actuated to allow the grain to be fed into the container 95 by the feeder 75, to a time the grain is entirely discharged from the container 95 through the discharge port 97. The function of a timer $T_2$ connected to the I/O interface 122 will be described later. A keyboard 127 is connected to the I/O interface 122 in order to input any desired set values to the CPU 121. A CRT (Cathode-ray Tube) 128 is connected to the I/O interface 122 to display data processed in the CPU 121, and a printer 129 is connected to the I/O interface to print out the data, if desired. Various detectors 130 are connected to the CPU 121 to detect a break-down or fault of the system, an operational condition at a subsequent working station and the like so as to supply stop signals to the CPU 121.

Figure 3:
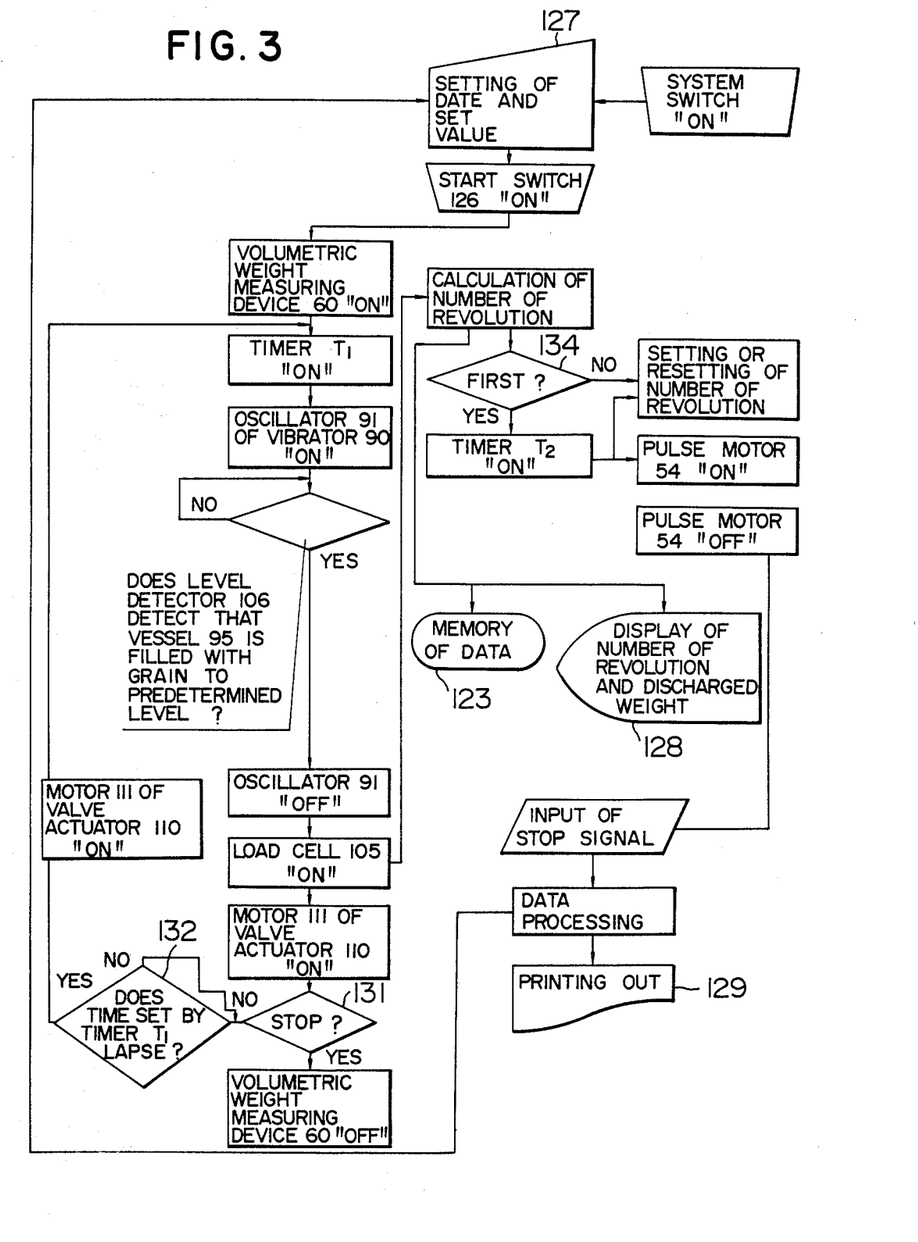
FIG. 3 is a flow chart illustrating an operation of the grain handling system shown in FIG. 1.

Referring now to FIG. 3, the operation of the grain handling system in accordance with the first embodiment of the invention shown in FIGS. 1 and 2 will be described.

A system switch for the overall system is turned on. The keyboard 127 inputs a date and a set value of a weight per unit time of the grain to be discharged by the rotary valve assembly 10, to the computer 120. Then, the start switch 126 of the volumetric weight measuring device 60 is turned on to supply an electric power to the volumetric weight measuring device 60. The CPU 121 supplies an "ON" signal to the timer $T_1$. The oscillator 91 of the vibrator 90 is activated in response to the switch-on of the timer $T_1$ to vibrate the feeder 75. The thus vibrated feeder 75 introduces a part of the grain flowing along the duct 1 into the feeder 75 through the branch duct 71, and feeds the grain into the container 95 through the discharge port 81 of the feeder 75. The level detector 106 detects that the grain introduced into the container 95 reaches the predetermined level to supply the detecting signal to the CPU 121. In response to the detecting signal, the CPU 121 supplies an "OFF" signal to the oscillator 91 of the vibrator 90 to halt or suspend the operation of the vibrator and then, supplies an "ON" signal to the load cell 105 of the weight measuring mechanism 100 to cause the load cell 105 to measure the weight per unit volume, that is, the volumetric weight of the grain within the container 95 to supply the signal representative of the measured volumetric weight to the CPU 121. The volumetric weight signal is stored in the memory 123. In response to the volumetric weight signal from the load cell 105, the CPU 123 supplies an "ON" signal to the motor 111 of the valve actuator 110 to actuate the motor to thereby cause the valve member 108 to move from the closed position shown by the solid lines in FIG. 1 to the open position shown by the two-dot-and-dash lines therein, so as to allow the grain within the container 95 to be discharged onto the conveyor 115 through the discharge port 97. A logic element 131 judges whether or not the stop signal from the keyboard 127 or the detectors 130 shown in FIG. 2 is supplied. When the stop signal is not inputted, the logic element 132 judges whether or not the time set by the timer $T_1$ lapses. If the judgement by the logic element 132 indicates "NO", the signal from the logic element 132 is again inputted into the logic element 132, to wait for a lapse of the time set by the timer $T_1$. When the judgement by the logic element 132 indicates "YES", the CPU 121 supplies an "ON" signal to the motor 111 of the valve actuator 110 to cause the valve member 108 to move from its open position to the closed position. At the same time, the timer $T_1$ is again set. This cycle is repeated until the stop signal is inputted into the CPU 121. Thus, the load cell 105 of the weight measuring mechanism 100 in the volumetric measuring device 60 measures the volumetric weight of the grain in every cycle, and the signal representative of the volumetric weight is successively inputted into the CPU 121. The CPU 121 processes the volumetric signal and the set value signal from the keyboard 127, to calculate the number of revolution per unit time of the valve member 32 of the valve assembly 10. Namely, assuming that the set value of the weight per unit time of the grain to be discharged by the rotary valve assembly 10 is Ws Kg/sec, the grain discharge volume per one revolution of the valve member 32 of the rotary valve assembly 10 is V m$^3$, and the volumetric weight measured by the load cell 105 is Wv Kg/m$^3$, the number of revolution per unit time N is given by the following equation.

$$N = Ws/(Wv \cdot V) \tag{1}$$

The CPU 121 performs the calculation in accordance with the equation (1) and sets the number of revolution per unit time of the valve member 32. The data including the thus calculated and set number of revolution N, the set value of weight per unit time Ws Kg/sec from the keyboard 127, and the volumetric weight Wv Kg/m$^3$ measured by the load cell 105 are stored in the memory 123, and are displayed by the CRT 128 and printed out by the printer 129, if desired.

The logic element 134 judges whether or not the setting of the number of revolution of the valve member obtained by the calculation in accordance with the equation (1) is carried out for the first time after the start switch 126 is turned on. When the judgement by the logic element 134 indicates "YES", the CPU 121 supplies an "ON" signal to the timer $T_2$ setting a time duration corresponding to a time duration required for the start-up of the conveyor 116 and the start-up of the subsequent work station. After the time set by the timer $T_2$ lapses, an "ON" signal is fed to the pulse motor 54 to cause the same to rotate the valve member 32 at the number of revolution per unit time calculated and set by the CPU 121. When the judgement by the logic element 134 indicates "NO", in other words, when the setting of the number of revolution of the valve member 32 obtained by the calculation in accordance with the equation (1) indicates the second or the following time after the start switch 126 is turned on, the CPU 121 supplies directly to the pulse motor 54 signals each indicative of the set number of revolution calculated in accordance with the equation (1) on the basis of the associated one of the volumetric weight signals subsequently fed from the load cell 105 and the set gravimetric flow rate value from the keyboard 127, so that the pulse motor 54 rotates the valve member 32 of the rotary valve assembly 10 in response to the set number of revolution signal, that is, the number of revolution already set is corrected. Thus, even if the volumetric weight of the grain is changed, the number of revolution of the valve member 32 of the rotary valve assembly 10 is controlled such that the weight per unit time of the grain discharged from the valve assembly 10 is kept equal to the set value from the keyboard 127.

When the stop signal from the keyboard 127 or the detectors 130 is inputted into the CPU 121, the CPU supplies an "OFF" signal to the pulse motor 54 to suspend the operation of the pulse motor, and the logic element 131 passes the judgement of "YES" to suspend the operation of the volumetric weight measuring device 60. Thereafter, the CPU processes the data obtained until now to cause the printer 129 to print out the data. The control system is ready for new setting of the weight flow rate.

Figure 4:
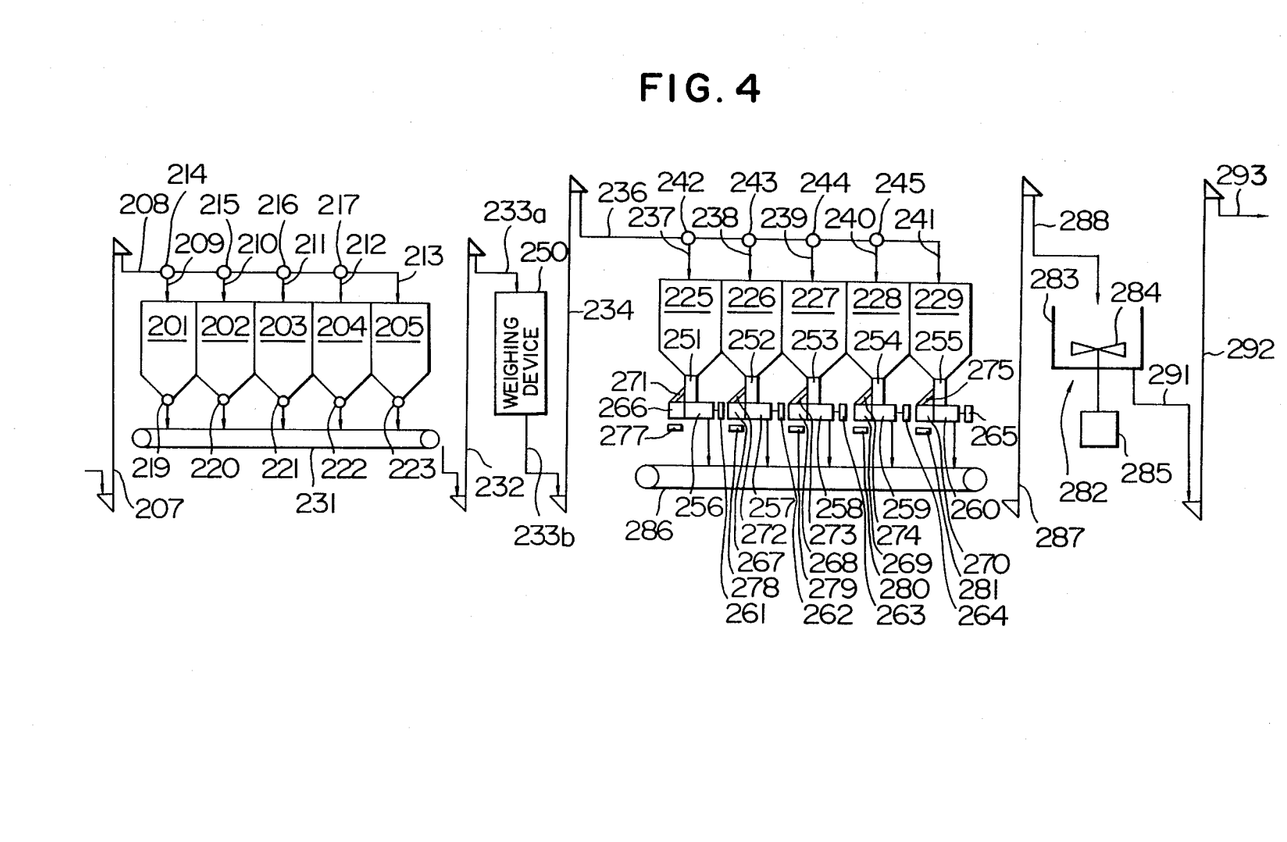
FIG. 4 is a diagrammatic view illustrating a grain handling system in accordance with a second embodiment of the present invention.

Referring now to FIG. 4, a grain handling system in accordance with a second embodiment of the present invention includes a plurality of storage tanks 201 to 205 (five tanks are shown in FIG. 4). A first delivery system for delivering five different kinds of grains to the storage tanks 201 to 205, respectively, includes an elevator 207 and a distributing duct 208 connected to a top end of the elevator 207. The distributing duct 208 includes five branch ducts 209 to 213 connected to the duct 208 and four change-over valves 214 to 217 provided at the connections between the first four branch ducts 209 to 212 and the distributing duct 208, respectively. The tanks 201 to 205 have at their respective bottom discharge ports valves 219 to 223. The grain handling system also includes mixing preparation tanks 225 to 229 corresponding in number to the storage tanks 201 to 205, and a second delivery system for delivering the grains from the storage tanks to the mixing preparation tanks, respectively. The second delivery system includes a conveyor 231 for delivering the grains discharged from the respective discharge ports of the storage tanks 201 to 205, an elevator 232 having a bottom thereof communicating with a downstream end of the conveyor 231, a duct 233a having an upstream end thereof connected to a top of the elevator 232, a duct 233b having an upstream end thereof communicatable with a downstream end of the duct 233a, an elevator 234 having a lower end thereof communicating with a downstream end of the duct 233b, a distributing duct 236 connected to a top of the elevator 234, branch ducts 237 to 241 connected to the distributing duct 236, and four change-over valves 242 to 245 provided at the connections between the first four branch ducts 237 to 240 and the distributing duct 236, respectively. A weighing device 250 is connected to the downstream end of the duct 233a and to the upstream end of the duct 233b to measure the weights of the respective grains delivered through the ducts 233a and 233b. The weighing device 250 may be a weighing device disclosed in the U.S. Pat. No. 3,966,000 or a weighing device which is known to one skilled in the art as a "hopper scale".

The discharge ports of the mixing preparation tanks 225 to 229 respectively communicate with upstream intake ends of ducts 251 to 255. Downstream discharge ends of the ducts 251 to 255 communicate with rotary valve assemblies 256 to 260, respectively. The rotary valve assemblies 256 to 260 are driven by pulse motors 261 to 265, respectively. Each of volumetric weight measuring devices 266 to 270 communicates with the associated duct 251-255 through the associated branch duct 271-275. The grains discharged from the respective volumetric weight measuring devices 266 to 270 are returned back to the corresponding storage tanks 201 to 205 by suitable delivery systems through respective conveyors 277 to 281. Each of the ducts 251 to 255 and each of the branch ducts 271 to 275 are respectively substantially the same in construction and function as the duct 1 and the branch duct 71 described and illustrated in the foregoing first embodiment, and will not be required to be described in detail. Each of the rotary valve assemblies 256 to 260 and each of the pulse motors 261 to 265 are respectively substantially the same in construction and function as the rotary valve assembly 10 and the pulse motor 54 described and illustrated in the first embodiment, and will not be required to be described in detail. Similarly, each of the volumetric weight measuring devices 266 to 270 is substantially the same in construction and function as the volumetric weight measuring device 60 described and illustrated in the first embodiment, and will not be required to be described in detail.

The grain handling system includes a mixing station 282, a third delivery system for delivering the grains respectively discharged out of the mixing preparation tanks 225 to 229 to the mixing station, and a fourth delivery system for delivering the grains mixed at the mixing station 282 to a desired location. The mixing station 282 includes a mixing tank 283, an agitating vane assembly 284 for agitating and mixing the grains fed into the mixing tank, and a motor 285 for drivingly rotating the agitating vane assembly 284. The third delivery system includes a conveyor 286 for delivering the grains respectively discharged through the rotary valve assemblies 256 to 260, an elevator 287 having a lower end thereof communicating with a downstream end of the conveyor 286, and a duct 288 having a downstream end thereof communicating with the mixing tank 283 and an upstream end connected to a top of the elevator 287. The fourth delivery system includes a duct 291 having an upstream end thereof connected to a bottom of the mixing tank 283, an elevator 292 having a lower end thereof connected to a downstream end of the duct 291, and a duct 293 having an upstream end thereof connected to a top of the elevator 292 for delivering the mixed grains to a desired location.

Figure 5:
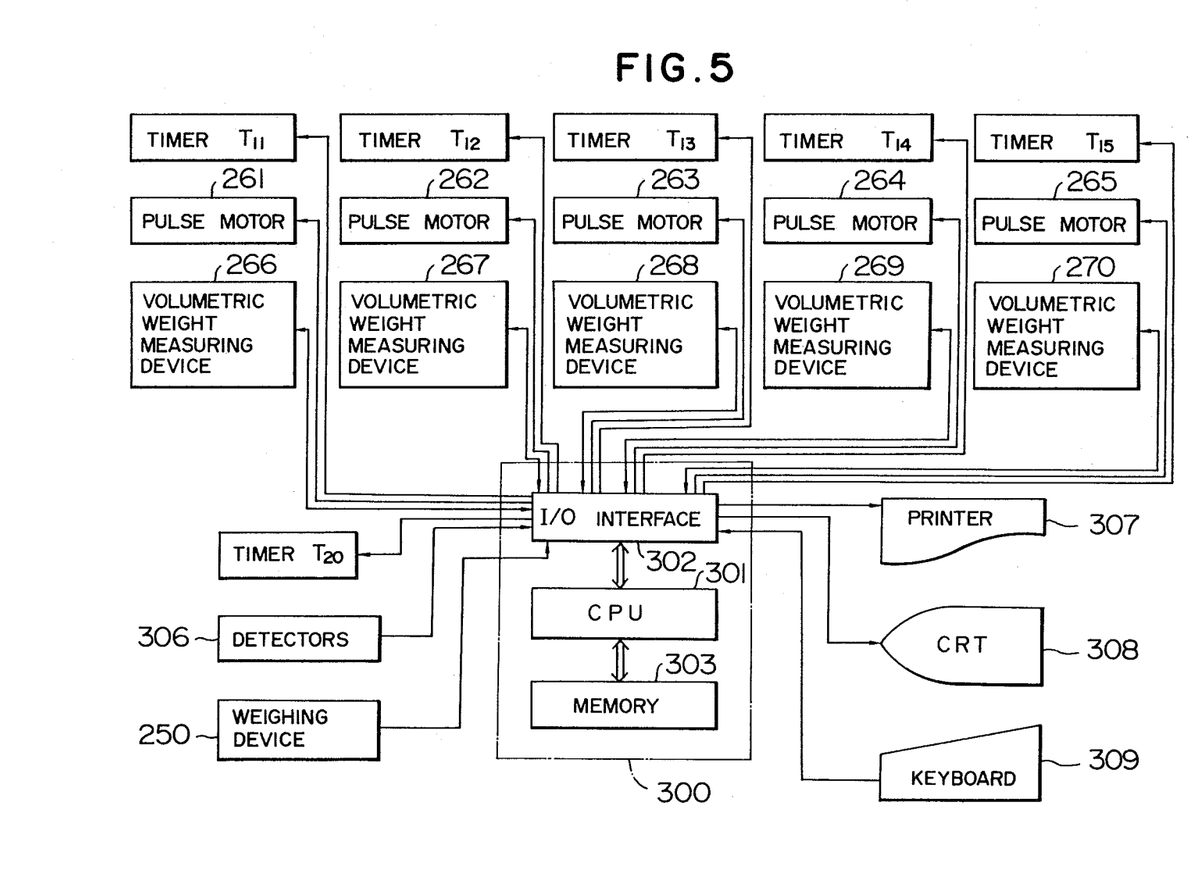
FIG. 5 is a block diagram of a control system incorporated in the grain handling system shown in FIG. 4.

Referring now to FIG. 5, a control system incorporated in the grain handling system shown in FIG. 4 includes a microcomputer 300 having a CPU 301, an I/O interface 302 connected to the CPU, and a memory 303 connected to the CPU. The volumetric weight measuring devices, the pulse motors and timers 266, 261 and $T_{11}$; 267, 262 and $T_{12}$; 268, 263 and $T_{13}$; 269, 264 and $T_{14}$; and 270, 265 and $T_{15}$ associated with the mixing preparation tanks 225 to 229, respectively, are connected to the I/O interface 302. Each of the timers $T_{11}$ to $T_{15}$ is substantially the same in construction and function as the timer $T_1$ explained and illustrated in the foregoing first embodiment, and will not be required to be repeatedly described. Timer $T_{20}$, detectors 306, printer 307, CRT 308 and keyboard 309 connected to the I/O interface 302 are substantially the same in construction and function as the timer $T_2$, the detectors 130, the printer 129, the CRT 128 and the keyboard 127 of the first embodiment, respectively, and will not be required to be repeatedly described. The weighing device 250 connected to the I/O interface 302 is adapted to measure the weights of the respective grains delivered through the ducts 233a and 233b and supplies signals representative of the weights of the respective grains to the CPU 301.

Referring now to FIGS. 4 and 5, the operation of the grain handling system will be described. The grain handling system shown in FIGS. 4 and 5 is operated in two different operational modes. The first operational mode is an operational mode in which the weighing device 250 is brought into an inoperative condition and the respective grains do merely pass through the weighing device 250. In this case, the weighing device 250, the ducts 233a and 233b and the elevator 232 may be eliminated, and the downstream end of the conveyor 231 may be in direct communication with the lower end of the elevator 234. Also, in the first operational mode, if desired, the elevator 207, the storage tanks 201 to 205 and the conveyor 231 may be eliminated in addition to the weighing device 250, the ducts 233a and 233b and the elevator 232. The second operational mode is an operational mode in which the weighing device 250 is rendered operative.

The first operational mode will first be described. A kind of grain delivered by the elevator 207 is fed to the first storage tank 201, with the discharge port of the first storage tank 201 being closed by the valve 219 and only the duct 208 and the branch duct 209 being allowed to communicate with each other by the change-over valve 214. Thereafter, the change-over valve 214 is moved into a position where the communication between the duct 208 and the branch duct 209 is interrupted and the duct 208 and the change-over valve 215 communicate with each other. With the valve 220 closing the discharge port of the second storage tank 202 and the change-over valve 215 allowing only the duct 208 and the branch duct 210 to communicate with each other, a second kind of grain delivered by the elevator 207 is fed to the second storage tank 202. Similarly, third, fourth and fifth kinds of grains are fed to the third, fourth and fifth storage tanks 203, 204 and 205, respectively.

Subsequently, the conveyor 231 and the elevators 232 and 234 are operated. The change-over valve 242 is actuated to the position where the duct 236 and the branch duct 237 only are communicated with each other. The valve 219 is actuated to open the discharge port of the storage tank 201. The first kind of grain within the first storage tank 201 is discharged through the discharge port thereof onto the conveyor 231. The first kind of grain is delivered to the first mixing preparation tank 225 through the conveyor 231, elevator 232, ducts 233a and 233b, elevator 234, duct 236 and branch duct 237. Then, the discharge port of the first storage tank 201 is closed by the valve 219, and the change-over valve 242 is moved into such position as to interrupt the communication between the duct 236 and the branch duct 237 and to allow the duct 236 and the change-over valve 243 to communicate with each other. Then, the discharge port of the second storage tank 202 is opened by the valve 220. Also, the change-over valve 243 is moved into such position as to allow the duct 236 and the branch duct 238 to communicate with each other. The second kind of grain within the second storage tank 202 is discharged onto the conveyor 231 through the discharge port of the tank 202. The second kind of grain is delivered to the second mixing preparation tank 226 through the conveyor 231, elevator 232, ducts 233a and 233b, elevator 234, duct 236 and the branch duct 238. Similarly, the third, fourth and fifth kinds of grains are delivered from the third, fourth and fifth storage tanks 203, 204 and 205 to the third, fourth and fifth mixing preparation tank 227, 228 and 229.

Subsequently, the electric power source for the entire system including volumetric weight measuring devices 266 to 270, the rotary valve assemblies 256 to 260, the pulse motors 261 to 265 and the control system therefor is switched-on. The keyboard 309 inputs the date and the respective set weight values per unit time of the first to fifth kinds of grains respectively discharged through the rotary valve assemblies 256 to 260 to the computer 300. Then, the common start switch for the volumetric weight measuring devices 266 to 270 is turned on to supply electric power to the volumetric measuring devices. The CPU 301 causes the respective switches of the timers $T_{11}$ to $T_{15}$ to be turned on. The volumetric weight measuring devices 226 to 270 supply the volumetric weight signals to the CPU, respectively, in a manner as described with reference to FIGS. 1 to 3. The CPU 301 processes these volumetric weight signals and the set signals from the keyboard 309 and calculates the numbers of revolusion per unit time of the respective valve members of the rotary valve assemblies 256 to 260. Namely, assuming that the set values of weight per unit time of the respective grains discharged from the rotary valve assemblies 256 to 260 are $Ws_1$ Kg/sec, $Ws_2$ Kg/sec, $Ws_3$ Kg/sec, $Ws_4$ Kg/sec and $Ws_5$ Kg/sec, the grain discharge volume per one revolution of the valve member of each of the rotary valve assemblies 256 to 260 is V m$^3$, and the volumetric weights of the respective grains measured by the volumetric weight measuring devices 266 to 270 are $Wv_1$ Kg/m$^3$, $Wv_2$ Kg/m$^3$, $Wv_3$ Kg/m$^3$, $Wv_4$ Kg/m$^3$ and $Wv_5$ Kg/m$^3$, the numbers of revolution $N_1$ to $N_5$ per unit time of the respective valve members of the rotary valve assemblies 256 to 260 are given as follows.

$$\left.\begin{array}{l} N_1 = Ws_1/(Wv_1 \cdot V) \\ N_2 = Ws_2/(Wv_2 \cdot V) \\ N_3 = Ws_3/(Wv_3 \cdot V) \\ N_4 = Ws_4/(Wv_4 \cdot V) \\ N_5 = Ws_5/(Wv_5 \cdot V) \end{array}\right\} \quad (2)$$

The CPU 301 carries out the calculations in accordance with the equations (2) described above and set the numbers of revolution per unit time of the valve members of the respective rotary valve assemblies 256 to 260. Data including the thus calculated and set numbers of revolution $N_1$ to $N_5$ per unit time, and the set values $Ws_1$ to $Ws_5$ Kg/sec of the gravimetric flow rate per unit time from the keyboard 304 are inputted into the memory 303 and stored therein, and displayed by the CRT 308, if desired.

The computer 300 judges whether the setting of the numbers of revolution per unit time of the valve members of the respective rotary valve assemblies 256 to 260 obtained from the calculation in accordance with the above equation (2) is performed for the first time after the common start switch for the volumetric weight measuring devices 266 to 270 is turned on. If the judgement by the computer 300 indicates "YES", the CPU 301 supplies an "ON" signal to the timer $T_{20}$ which sets a time duration corresponding to a time duration required for the start-up of the conveyor 286, elevators 287 and 292 and mixing station 282. After the time set by the timer $T_{20}$ lapses, the "ON" signals are subsequently fed to the respective pulse motors 261 to 265 with a predetermined time lag to cause the pulse motors to respectively and subsequently rotate the rotary valve assemblies 256 to 260 with the predetermined time lag and at the respective numbers of revolution per unit time $N_1$ to $N_5$ calculated in accordance with the above equation (2) by the CPU 301 so that the grains respectively discharged by the rotary valve assemblies 256 to 260 and delivered by the conveyor 286 reach the bottom of the elevator 287 at the same time. More particularly, the first rotary valve assembly 256 is first rotated to discharge the first kind of grain from the first mixing preparation tank 225 onto the conveyor 286. When the first kind of grain conveyed by the conveyor 286 is advanced to a location just before a location just below the second rotary valve assembly 257, the second rotary valve assembly is rotated to discharge the second kind of grain from the second mixing preparation tank 226 onto the conveyor 286. When the first and second kinds of grains are advanced to a location just before a location just below the third rotary valve assembly 258, the third rotary valve assembly is rotated to discharge the third kind of grain from the third mixing preparation tank 227 onto the conveyor 286. When the first to third kinds of grains are advanced to a location just before a location just below the fourth rotary valve assembly 259, the fourth rotary valve assembly is rotated to discharge the fourth kind of grain from the fourth mixing preparation tank 228 onto the conveyor 286. When the first to fourth kinds of grains are advanced to a location just before a location just below the fifth rotary valve assembly 260, the fifth rotary valve assembly is rotated to discharge the fifth kind of grain from the fifth mixing preparation tank 229 onto the conveyor 286. Thus, the first to fifth kinds of grains respectively discharged from the first to fifth mixing preparation tanks 225 to 229 reach the bottom end of the elevator 287 at the same time. The predetermined time lag is suitably set by a timer or the like dependent upon the moving velocity of the conveyor 286. If the computer 300 judges that the setting of the numbers of revolution per unit time of the respective valve members obtained by the calculation in accordance with the above equation (2) is the second or the following times after the common start switch for the respective volumetric weight measuring devices 266 to 270 is turned on, the CPU 301 directly supplies to the respective pulse motors 261 to 265 the signals representative of the set numbers of revolution per unit time calculated in accordance with the equations (2) on the basis of the set gravimetric flow rate values from the keyboard 309 and the volumetric weight signals subsequently fed from the respective volumetric weight measuring devices 266 to 270. The pulse motors 261 to 265 are operative in response to the set numbers of revolution per unit time to respectively rotate the valve members of the rotary valve assemblies 256 to 260. Thus, even if the volumetric weights of the respective kinds of grains are varied, the rotary valve assemblies accurately discharge the grains having the gravimetric flow rates respectively equal to the gravimetric flow rate values set by the keyboard 309.

If the stop signal from the keyboard 309 or the detectors 306 is inputted into the CPU 301 through the I/O interface 302, the CPU supplies the "OFF" signals to the respective pulse motors 261 to 265 to suspend or halt the operations of the pulse motors, and supplies the "OFF" signal to the common start switch for the volumetric weight measuring devices 266 to 270 to suspend the operations of the volumetric weight measuring devices. Thereafter, the CPU processes the data obtained until now and causes the data to be printed out by the printer 307.

The grains respectively discharged from the rotary valve assemblies 256 to 260 are continuously fed to the mixing tank 283 of the mixing system 282 through the conveyor 286, elevator 287 and duct 288 and are agitated and mixed by the agitating vane assembly 284. The thus mixed grains are delivered to a desired location through the duct 291, elevator 292 and duct 293.

For example, assuming that the keyboard 309 sets the gravimetric weight values $Ws_1$ to $Ws_5$ such that the gravimetric weight values have the relation $Ws_1=1$ Kg/sec, $Ws_2=2$ Kg/sec, $Ws_3=3$ Kg/sec, $Ws_4=4$ Kg/sec and $Ws_5=5$ Kg/sec, it is possible to obtain the grain mixture having the mixing weight ratio of 1:2:3:4:5. Thus, in the grain handling system in accordance with the first operational mode of the second embodiment of the invention, it is possible to obtain the grain mixture having a desired weight mixture ratio. The CPU 301 receives the signals representative of what number of times the valve members of the rotary valve assembly 256 to 260 are rotated, and can calculate the total weight of the grain mixture on the basis of the signals.

The second operational mode noted above will now be described. The weighing device 250 measures the weight $W_1$ Kg of the first kind of grain fed from the first storage tank 201 to the first mixing preparation tank 225, the weight $W_2$ Kg of the second kind of grain fed to the second storage tank 202 to the second mixing preparation tank 226, the weight $W_3$ Kg of the third kind of grain fed from the third storage tank 203 to the third mixing preparation tank 227, the weight $W_4$ Kg of the fourth kind of grain fed from the fourth storage tank 204 to the fourth mixing preparation tank 228 and the weight $W_5$ Kg of the fifth kind of grain fed from the fifth storage tank 205 to the fifth mixing preparation tank 229. The weighing device 250 supplies to the CPU 301 signals representative of the weights of the respective grains. The respective total numbers of revolution $N_{11}$–$N_{15}$ of the valve members of the rotary valve assemblies 256 to 260, required for discharging the entire grains respectively contained in the mixing preparation tanks 225 to 229 are given as follows:

$$\left.\begin{array}{l} N_{11} = W_1/(Wv_1 \cdot V) \\ N_{12} = W_2/(Wv_2 \cdot V) \\ N_{13} = W_3/(Wv_3 \cdot V) \\ N_{14} = W_4/(Wv_4 \cdot V) \\ N_{15} = W_5/(Wv_5 \cdot V) \end{array}\right\} \quad (3)$$

where $Wv_1$–$Wv_5$ are the volumetric weights (Kg/m$^3$) of the respective grains measured by the volumetric measuring devices 226 to 270, and V is a discharge volume (m$^3$) per one revolution of the valve member of each of the rotary valve assemblies 256 to 260.

The CPU 301 performs the calculations in accordance with the above equation (3) and sets the total numbers of revolution $N_{11}$ to $N_{15}$ of the valve members of the respective rotary valve assemblies 256–260. The CPU 301 supplies "ON" signals subsequently to the respective pulse motors with a predetermined time lag to cause the pulse motors to drive the valve members of the rotary valve assemblies 256 to 260 with the predetermined time lag such that the valve members of the rotary valve assemblies are rotated within the respective time durations which are the same as each other and by the respective total numbers of revolution $N_{11}$ to $N_{15}$ set and calcuated in accordance with the above equations (3) by the CPU and such that the grains respectively discharged by the rotary valve assemblied 256 to 260 and conveyed by the conveyor 286 reach the bottom end of the elevator 287 at the same time in the same manner as that described with reference to the "first operational mode". The time durations are calculated and determined in accordance with the capacity of each of the rotary valve assemblies by the CPU. Thus, the first through fifth kinds of grains are discharged from the first through fifth mixing preparation tanks 225 to 229 by the rotary valve assemblies 256 to 260 with the time lag and the discharging of the respective entire grains are completed with the time lag. The grains discharged from the rotary valve assemblies 256 to 260 are delivered to the mixing tank 283 through the conveyor 286, elevator 287 and duct 288, are mixed and agitated by the agitating vane assembly 284 and are delivered to a desired location through the elevator 292 and the duct 293.

The data including the total numbers of revolution $N_{11}$ to $N_{15}$ set and calculated by the CPU 301, the weights $W_1$ to $W_5$ Kg of the respective grains measured by the weighing device 250, the volumetric weights $Wv_1$ to $Wv_5$ of the respective grains measured by the volumetric weight measuring devices 266 to 270 and the total discharge weight $W_1+W_2+W_3+W_4+W_5$ (Kg) are stored in the memory 303, and are displayed by the CRT 308 and printed out by the printer 307, if desired.

In the second operational mode of the grain handling system, since the time durations between the start and the completion of the discharging of the respective grains from the mixing preparation tanks 225 to 229 are the same as each other, it is possible to obtain grain mixture mixed in more uniform manner.

Although the above described embodiments have been described as having the rotary valve assemblies 10; 256–260, valve assemblies each having two slide valve members spaced in the vertical direction may be used in place of the rotary valve assemblies.

What is claimed is:

1. A grain handling system comprising:
   at least one flow passage defining means for defining a grain flow passage having an upstream intake end and a downstream discharge end so as to allow the grain to flow along said grain flow passage from said upstream intake end to said downstream discharge end,
   valve means disposed in communication with said downstream discharge and of said grain flow passage for controlling the flow rate of grain discharged from said downstream discharge end;
   volumetric weight measuring means for receiving the grain to be delivered toward said valve means and for measuring weight per unit volume of the received grain under stationary condition to generate a volumetric weight signal;
   computer means connected to said volumetric measuring means for receiving the volumetric weight signal therefrom to generate a control signal on the basis of said volumetric weight signal; and drive means drivingly connected to said valve means and connected to said computer means, said valve means being operative in response to said control signal from said computer means to drive said valve means so as to allow the grain discharged by said valve means to be controlled in terms of weight unit.

2. A grain handling system according to claim 1, further comprising input means connected to said computer means for inputting into said computer means a set weight value per unit time of the grain discharged by said valve means, said computer means generating said control signal on the basis of the volumetric weight signal from said volumetric weight measuring means and said set weight value from said input means.

3. A grain handling system according to claim 2, wherein said valve means includes a rotary valve, and said control signal from said computer means fed to said driver means is representative of a number of revolution per unit time of said rotary valve.

4. A grain handling system according to claim 3, wherein said drive means operative in response to said control signal from said computer means includes a pulse motor.

5. A grain handling system according to claim 4, wherein said computer means comprises a memory connected thereto for storing data including at least the volumetric weight of grain measured by said volumetric weight measuring means, the number of revolution per unit time of said pulse motor and the total weight of grain discharged by said rotary valve, said grain handling system further comprising a display connected to said computer means for displaying said data and a printer connected to said computer means for printing said data.

6. A grain handling system according to any one of the preceding claims 1 to 4, wherein said volumetric measuring means is in communication with said grain flow passage with withdraw into said volumetric measuring means a part of the grain passing through said grain flow passage so as to measure the volumetric weight of the grain.

7. A grain handling system according to claim 4, further comprising a duct having an intake port communicating with said grain flow passage and a discharge port communicating with said volumetric weight measuring means to withdraw the part of the grain flowing along said grain flow passage and to introduce the part of the grain into said volumetric weight measuring means, said volumetric weight measuring means including a container having an inlet opening communicating with said discharge port of said duct and weight measuring means supporting said container for measuring the weight of the grain having a predetermined volume when the grain having the predetermined volume is introduced into said container, to generate said volumetric weight signal.

8. A grain handling system according to claim 7, wherein said volumetric weight measuring means further includes level detecting means associated with said container for detecting that the grain is introduced into said container at a predetermined level, to generate a detecting signal, said weight measuring means including a load cell operative in response to said detecting signal from said level detecting means to generate said volumetric weight signal.

9. A grain handling system according to claim 8, wherein said container includes a discharge opening, said volumetric weight measuring means further including a valve member movable between a normally closed position where said discharge opening of said container is closed and an open position where said discharge opening of said container is opened, and a valve actuator connected to said valve member and operative in response to said volumetric weight signal from said load cell to move said valve member from said closed position to said open position so as to allow the grain within the container to be discharged through said discharge opening of said container.

10. A grain handling system according to claim 9, wherein said volumetric weight measuring means further includes a switch movable between an "ON" position wherein said volumetric weight measuring means is activated and an "OFF" position where said volumetric weight measuring means is deactivated, a vibratory feeder having an upstream end communicating with the discharge port of said duct and a downstream end communicating with the inlet opening of said container for feeding the grain from the discharge port of said duct to said container, and a vibrator for vibrating said vibratory feeder, said vibrator being activated in response to the movement of said switch to its "ON" position to vibrate said vibratory feeder and being deactivated in response to said detecting signal from said detecting means.

11. A grain handling system according to claim 10, further comprising a timer for setting a time duration corresponding to a time duration from a time the operation of said vibratory feeder is initiated to a time the entire grain is discharged from said container, said timer initiating its operation in response to the movement of said switch to its "ON" position to activate said vibrator, said computer means including first judgement means for judging whether the operation of said volumetric weight measuring means should be suspended after the activation of said actuator, and second judgement means for judging whether the time set by said timer lapses when said first judgement means judges that the operation of said volumetric weight measuring means should not be suspended, and said timer again initiating its operation when said second judgement means judges that the time set by said timer has lapsed.

12. A grain handling system according to claim 1, wherein there are provided a plurality of flow passage defining means independently from each other, each of said flow-passage means defining said grain flow passage, there being provided a plurality of valve means with one disposed in communication with said downstream discharge end of each of said grain flow passages, there being provided a plurality of volumetric weight measuring means for measuring volumetric weights of the respective grains delivered toward the respective valve means to generate the respective volumetric weight signals, there being provided a plurality of drive means with one drivingly connected to each of said valve means, said computer means supplying to the respective drive means control signals respectively based on said volumetric weight signals.

13. A grain handling system according to claim 12, further comprising input means connected to said computer means for inputting into said computer means respective set weight values per unit time of the grains respectively discharged by said valve means, and said computer means generating said control signals on the basis of the respective volumetric weight signals from said volumetric weight measuring means and the respectively corresponding set weight signals from said input means.

14. A grain handling system according to claim 13, wherein each of said valve means includes a rotary valve, each of the respective control signals from said computer means supplied to said drive means being representative of a number of revolution per unit time of the associated rotary valve.

15. A grain handling system according to claim 14, wherein each of said drive means operative respectively in response to the control signals from said computer means includes a pulse motor.

16. A grain handling system according to claim 15, further comprising a mixing tank, means for delivering to said mixing tank the grains respectively discharged by said valve means, and means for agitating and mixing the grains delivered into said mixing tank.

17. A grain handling system according to claim 16, further comprising a plurality of mixing preparation tanks with one associated with each of said grain flow passages, each of said mixing preparation tanks being provided with a discharge port communicating with the upstream intake end of the associated grain flow passage, said grain handling system further comprising a plurality of storage tanks corresponding in number to said mixing preparation tanks and means for delivering different kinds of grains from said storage tanks to said mixing preparation tanks, respectively.

18. A grain handling system according to claim 15, wherein said computer means comprises a memory connected thereto for storing data including at least the volumetric weights of the respective grains measured by said volumetric weight measuring means, the respective numbers revolution per unit time of said pulse motors and total weights of the grains respectively discharged by said rotary valves, said grain handling system further comprising a display connected to said computer means for displaying said data and a printer connected to said computer means for printing said data.

19. A grain handling system according to claim 12, further comprising a plurality of mixing preparation tanks with one associated with each of said grain flow passages, each of said mixing preparation tanks being provided with a discharge port communicating with the upstream intake end of the associated grain flow passage, said grain handling system further comprising weighing means for measuring the weights of the respective grains fed to said mixing preparation tanks to supply to said computer means signals representative of the weights corresponding to the respective grains, said computer means supplying to the respective drive means the control signals respectively calculated on the basis of the weight signals from said weighing means and the respectively corresponding volumetric weight signals from said volumetric weight measuring means.

20. A grain handling system according to claim 19, wherein each of said valve means includes a rotary valve, each of the respective control signals from said computer means supplied to said drive means being representative of a total number of revolution of the associated rotary valve, required for discharging the entire grain contained in the associated mixing preparation tank.

21. A grain handling system according to claim 20, wherein said computer means controls said drive means to cause the same to respectively drive said rotary valves such that said rotary valves are subsequently rotated with a predetermined time lag and said rotary valves are rotated by the respective total numbers of revolution within the respective time durations which are the same as each other.

22. A grain handling system according to claim 21, wherein each of said drive means respectively operative in response to the control signals from said computer means includes a pulse motor.

23. A grain handling system according to claim 22, further comprising a mixing tank, means for delivering to said mixing tank the grains discharged from the respective valve means, and means for agitating and mixing the grains delivered into said mixing tank.

24. A grain handling system according to claim 23, further comprising a plurality of storage tanks corresponding in number to said mixing preparation tanks and means for respectively delivering the grains from said storage tanks to said mixing preparation tanks, said weighing means measuring the weights of the respective grains delivered from said storage tanks to said mixing preparation tanks.

25. A grain handling system according to claim 17 or 24, wherein each of said volumetric weight measuring means is in communication with the associated grain flow passage to withdraw a part of the associated grain flowing along said associated grain flow passage so as to measure the volumetric weight of the associated grain.

26. A grain handling system according to claim 25, further comprising ducts with one associated with each of said flow passage defining means and with one having an intake port communicating with the associated grain flow passage and a discharge port communicating with the associated volumetric weight measuring means to withdraw the part of the associated grain flowing along the associated grain flow passage so as to introduce the part of the associated grain into the associated volumetric weight measuring means, each of said volumetric weight measuring means including a container having an inlet opening communicating with the discharge port of the associated duct and weight measuring means supporting said container and measuring the weight of the associated grain having a predetermined volume when the associated grain having the predetermined volume is introduced into said container, to generate said volumetric weight signal.

27. A grain handling system according to claim 26, wherein each of said volumetric weight measuring means further includes level detecting means associated with the associated container for detecting that the associated grain is introduced into the associated container at a predetermined level, to generate a detecting signal, said weight measuring means of each of said volumetric weight measuring means including a load cell operative in response to said detecting signal from said level detecting means to generate the associated volumetric weight signal.

28. A grain handling system according to claim 27, wherein each of said containers includes a discharge opening, each of said volumetric weight measuring means further including a valve member movable between a normally closed position where said discharge opening of the associated container is closed and an open position where said discharge opening of the associated container is opened, and a valve actuator connected to said valve member and operative in response to said volumetric weight signal from the associated load cell to cause said valve member to move from said closed position to said open position so as to allow the grain within the associated container to be discharged through the discharge opening thereof.

29. A grain handling system according to claim 28, wherein each of said volumetric weight measuring means further includes a switch movable between an "ON" position where the volumetric weight measuring means is activated and an "OFF" position where the volumetric weight measuring means is deactivated, a vibratory feeder having an upstream end communicating with the discharge port of the associated duct and a downstream end communicating with the inlet opening of the associated container to feed the grain from the discharge port of the associated duct to the associated container, and a vibrator for vibrating said vibratory feeder, said vibrator being activated in response to the movement of said switch to said "ON" position to vibrate said vibratory feeder and being deactivated in response to said detecting signal from the associated detecting means.

30. A grain handling system according to claim 29, further comprising timers with one associated with each of said volumetric weight measuring means for setting a time duration corresponding to a time duration from a time the operation of the associated vibratory feeder is initiated to a time the entire grain is discharged from the associated container, said timer initiating its operation in response to the movement of the associated switch to said "ON" position to activate the associated vibrator, said computer means including first judgement means associated with each of said volumetric weight measuring means for judging whether the operation of the associated volumetric weight measuring means should be suspended after the activation of the associated actuator and second judgement means for judging whether the time set by the associated timer lapses when said first judgement means judges that the operation of the associated volumetric weight measuring means should not be suspended, the associated timer again initiating its operation when said second judgement means judges that the time set by the associated timer has lapsed.

31. A grain handling system according to claim 20, wherein said computer means comprising a memory connected thereto for storing data including at least the volumetric weights of the respective grains measured by said volumetric weight measuring means, the respective total numbers of revolution of the pulse motors and weights of the respective grains measured by said weighing means, said grain handling system further comprising a display connected to said computer means for displaying said data and a printer connected to said computer means for printing said data.

* * * * *

UNITED STATES PATENT AND TRADEMARK OFFICE
CERTIFICATE OF CORRECTION

PATENT NO. : 4,544,280
DATED : October 1, 1985
INVENTOR(S) : Zendo Mitsukawa

It is certified that error appears in the above-identified patent and that said Letters Patent is hereby corrected as shown below:

Claim 3, line 4, change "driver" to --drive--.

Claim 6, line 4, change "with" to --to--.

Signed and Sealed this

Tenth Day of December 1985

[SEAL]

Attest:

DONALD J. QUIGG

*Attesting Officer*     *Commissioner of Patents and Trademarks*